UNITED STATES PATENT OFFICE 2,681,848

PREPARATION OF TITANIUM MONOXIDE

Eugene Wainer, Cleveland, Morris A. Steinberg, Lakewood, and Alfred A. Topinka, Cleveland, Ohio, assignors, by mesne assignments, to Horizons Titanium Corporation, Princeton, N. J., a corporation of New Jersey No Drawing. Application July 12, 1951, Serial No. 236,476

3 Claims. (Cl. 23—202)

Titanium monoxide has a number of uses, but heretofore there has been a lack of a practical process yielding material of desirable purity, and involving simple operations and avoidance of handicapping by-products. In accordance with the present invention however titanium monoxide may be prepared in a simple and direct manner, and having a particular advantage in that products of reaction are dissipated in gasiform condition, leaving the pure titanium monoxide as a solid residue. Other objects and advantages of the invention will appear from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In the prior art there have been described a variety of procedures, but the titanium monoxide product has tended to be of poor state of purity. Thus, it has been proposed to heat titanium dioxide in an inert atmosphere or atmosphere of hydrogen, with zinc, magnesium or calcium. Invariably such procedures do not yield a product of requisite purity. And at the same time, there is a by-product content which has to be removed chemically.

We have found that carbide of titanium, properly prepared, may be decomposed in the presence of reactive oxides to yield pure golden brown titanium monoxide substantially free of higher oxide. The procedure has the advantage in that relatively inexpensive starting materials are used, and that it is a process which is susceptible of large scale manufacture, thus presenting certain evident economies. In addition, however, it has the advantage that no by-products have to be dealt with, so that titanium monoxide does not have to be chemically treated, in that all of the by-products are eliminated in the form of gases under the conditions of the operation. As the reaction occurs between the raw materials in solid state with change of titanium carbide to monoxide and products in part solid and in part gasiform, or by a phase transformation as it might be termed, production of monoxide of titanium in this manner is particulary advantageous. And thus dealing with solid reactants the degree of efficiency of action is governed in large extent by the condition of the contacting particles. So that in general the finer the particles and the fewer the particles of impurities, i. e., the purer the material, the better the results.

In general, reaction is carried out between carbide of titanium suitably prepared, and one or more oxides of the general formula $MO_n$, in which $MO_n$ is $TiO_2$ and M otherwise is a second group metal except radium and $O_n$ therewith is an oxygen atom. Thus, the oxide reactant is the higher oxide of titanium itself or a periodic table second group metal oxide other than radium, practical considerations especially emphasizing the group consisting of zinc oxide and oxides of alkaline earth metals other than radium, and of these the monoxides of zinc, magnesium and calcium, or in other words monoxides of metals of group II of the periodic table whose atomic numbers are in the range 12–30, are particularly commercially desirable. Mixtures of the reactant oxides may be employed in some cases with advantage.

The carbide of titanium raw material should be very pure, and the finer its state of division, the more rapid and complete is the reaction. Thus, a particle size of the order of one micron or less is desirable. This is prepared by grinding the pure titanium carbide of commerce in an iron mill, for instance, equipped with a classifier so that the requisite degree of fineness can be obtained. The resultant slurry is then treated with hydrochloric acid to remove any iron which may have developed, and it is then washed until the chloride ions are removed. If any free graphite is present, it may be floated off by preparing a slightly alkaline slip of titanium carbide in water, and frothing so that the graphite goes into the froth. The froth and alkali are removed, and the titanium carbide is filtered, decanted and washed. It is dried on the filter, then is finally dried to a temperature not exceeding 80 to 100° C. The oxide reactant is also provided in a high state of purity and in finely divided condition, particle size of the order of one micron or less being desirable. Such pure finely divided material may be had as commercial products.

The carbide of titanium and the oxide reactant are thoroughly mixed, and desirably the mixture is then pressed under at least 10 tons per square inch pressure into dense pellets, with 5 to 10 per cent of water, for instance, as a temporary binder. Then the pressed pellets are thoroughly dried. The reaction is caried out at a temperature range in which the oxide reactant attacks the carbide. In general this involves a temperature of between about 1300 and 1750° C., and at a temperature for instance of 1500° C. the reaction is complete in one or two hours. A vacuum draw-off is supplied to the reaction zone, for instance on the order of 1 to 10 mm. of mercury. In the higher temperature ranges, the reaction proceeds much more rapidly. Using titanium dioxide as the reactant with the carbide of titanium, titanium monoxide and carbon monoxide are formed, and the carbon monoxide is withdrawn under the vacuum as fast as formed. Where oxides such as of zinc, magnesium and calcium are used, similarly titanium monoxide is formed, and carbon monoxide, and additionally, there is a sublimation of volatilization of metallic zinc, magnesium and calcium. These volatilized metals are condensed in a cold trap in the draw-off, and are generally retained there in an extremely finely divided state. After the reaction cools down, the equipment is flushed out with hydrogen, as a precaution to avoid spontaneous ignition of the finely powdered magnesium or calcium in the presence of air. If desired, the zinc, calcium or magnesium metal can be collected in a fused state, being melted down in the presence of argon from the cold trap at temperatures slightly above their melting point. Where mixtures of the oxide reactant are employed, as for instance titanium dioxide plus smaller amounts of magnesia or lime, there is an advantage of complete reduction of the carbide to titanium monoxide with a certain degree of stability. Such a mixture is normally used only when the reaction mixtures are extremely massive. Its primary effect seems to be the prevention of the reversal of reaction if the carbon monoxide is not eliminated from the zone of reaction rapidly enough.

While the preferred method of reaction is in an actively pumping vacuum system, the reaction may be carried out in purified argon if desired. From a commercial standpoint, however, the vacuum is less expensive.

Illustrative of the procedure of the invention, are the following examples:

*Example 1.*—60 grams of finely divided pure titanium carbide are thoroughly mixed with 160 grams of pigment grade titanium dioxide, i. e., 1 mol of TiC to 2 mols of $TiO_2$, and resulting in reaction as $TiC+2TiO_2 \rightarrow 3TiO+CO$. About 25 cc. of water are added to the mixture and the batch is granulated prior to pressing. Pellets roughly ½" in diameter and about ¼" thick are pressed in a die under a forming pressure of 10 tons per square inch. These pellets are then carefully dried in an oven at 110° C. The pellets are then placed in a pure zircon or pure alumina crucible of dense grades and then heated in a vacuum induction furnace using a graphite or molybdenum susceptor to develop the requisite heat during the course of which, the system is evacuated through a cold trap with the usual vacuum equipment. At about 1500° C., the reaction evidently begins because the pressure starts to rise rapidly. The temperature is maintained in the range of 1450° C. to 1550° C. until full vacuum conditions are again regained. For a batch of the order of 100 to 300 grams, this usually requires about one hour from the time the equipment reaches this temperature range. A yield of 190 grams of a porous golden brown regulus is obtained. It is found that if the temperature of heating be raised to around 1600° C. either during reaction or during the course of the reaction, this regulus is well vitrified. X-ray examinations indicate that this material is substantially pure titanium monoxide.

*Example 2.*—Under the same conditions as indicated in Example 1, 60 grams of titanium carbide are mixed with 163 grams of zinc oxide. In this particular case, both carbon monoxide and zinc metal are formed and the zinc metal is caught in the form of dust in the cold trap. The reaction is $TiC+2ZnO \rightarrow TiO+CO+2Zn$. The yield is about 64 grams of titanium monoxide. Reaction is under a vacuum or an inert gas.

*Example 3.*—60 grams of titanium carbide and 80 grams of magnesia are treated as in Example 1, and these materials react as $$TiC+2MgO \rightarrow TiO+CO+2Mg$$

Gaseous magnesium and carbon monoxide are formed and the magnesium is caught in the cold trap and the yield of about 63 grams of titanium monoxide develops. In the case of both the zinc and the magnesia reaction, it is usually advisable to raise the temperature to about 1600° C. during the last quarter of the thermal decomposition so as to sinter the mass pretty thoroughly and insure the complete elimination of all the by-products. Reaction is under a vacuum or inert gas.

In each of the foregoing reactions, yields are substantially quantitative and a very pure product is obtained.

*Example 4.*—60 grams of titanium carbide, 80 grams of $TiO_2$ and 40 grams of MgO are mixed and treated as in Example 1 in a vacuum or inert gas, and the reaction here is $$TiC+TiO_2+MgO \rightarrow 2TiO+Co+Mg$$

Magnesium metal and carbon monoxide are the gaseous products which are obtained in the temperature range of 1300 to 1600° C. and 129 grams of residue is left in the crucible.

In general, exclusion of air is important. The reactants are placed in a vessel and this is either evacuated or kept continually flushed with an inert gas, for example argon, and the temperature is then raised to the proper level, the vacuum conditions or freely flowing inert gas being maintained throughout the reaction.

In carrying out the foregoing reactions, difficulty is sometimes experienced in use of zircon crucibles at the upper range of temperature and in these cases, aluminum oxide is preferred although this material is also not completely satisfactory. This difficulty is the result of reaction which develops between the titanium monoxide and the base material. This difficulty may be practically eliminated by using a base plate of densely fired zirconia or barium zirconate.

Titanium monoxide as produced by the present process has an advantage of very high purity, suiting it to various uses directly, and particularly it is adaptable to the preparation of titanium metal.

This application is a division of our application, Serial No. 206,712, filed January 18, 1951.

Other modes of applying the principle of the invention may be employed, change being made as regards the details described, provided the features stated in any of the following claims or the equivalent of such be employed.

We therefore particularly point out and distinctly claim as our invention:

1. The method of producing titanium monoxide which comprises forming an intimate mixture of titanium carbide and titanium dioxide, heating the mixture to a temperature within the range of about 1300° to 1750° C. in an inert atmosphere, removing the resulting evolved carbon monoxide, and recovering the resulting residual titanium monoxide.

2. The method of producing titanium monoxide which comprises forming an intimate mixture of titanium carbide and titanium dioxide, the molar proportion of the titanium dioxide in the mixture being substantially twice that of the titanium carbide, heating the mixture to a temperature within the range of about 1300° to 1750° C. in an inert atmosphere, removing the resulting evolved carbon monoxide, and recovering the resulting residual titanium monoxide.

3. The method of producing titanium monoxide which comprises forming an intimate mixture of substantially pure titanium carbide, titanium dioxide and an oxide of the group consisting of zinc oxide, magnesium oxide and calcium oxide, heating the mixture to a temperature within the range of about 1300° to 1750° C. in an inert atmosphere, removing the resulting evolved carbon monoxide and vapor of the metal constituent of the oxide of said group of metal oxides, and recovering the resulting residual titanium monoxide.

4. The method of producing titanium monoxide which comprises forming an intimate mixture of titanium carbide and titanium dioxide, the molar proportion of the titanium dioxide in the mixture being substantially twice that of the titanium carbide, heating the mixture to a temperature of at least 1500° C. in an inert atmosphere, removing the resulting evolved carbon monoxide, and recovering the resulting residual titanium monoxide.

5. The method of producing titanium monoxide which comprises forming pellets of an intimate mixture of titanium carbide and titanium dioxide, heating the pelleted mixture to a temperature within the range of about 1300° to 1750° C. in an inert atmosphere, removing the resulting evolved carbon monoxide, and recovering the resulting titanium monoxide.

6. The method of producing titanium monoxide which comprises forming an intimate mixture of titanium carbide, titanium dioxide and zinc oxide, heating the mixture to a temperature within the range of about 1300° to 1700° C. in an inert atmosphere, removing the resulting evolved carbon monoxide and zinc vapor, and recovering the resulting residual titanium monoxide.

7. The method of producing titanium monoxide which comprises forming an intimate mixture of titanium carbide, titanium dioxide and magnesium oxide, heating the mixture to a temperature within the range of about 1300° to 1700° C. in an inert atmosphere, removing the resulting evolved carbon monoxide and magnesium vapor, and recovering the resulting residual titanium monoxide.

8. The method of producing titanium monoxide which comprises forming an intimate mixture of titanium carbide, titanium dioxide and calcium oxide, heating the mixture to a temperature within the range of about 1300° to 1700° C. in an inert atmosphere, removing the resulting evolved carbon monoxide and calcium vapor, and recovering the resulting residual titanium monoxide.

References Cited in the file of this patent

UNITED STATES PATENTS

| Number | Name | Date |
| --- | --- | --- |
| 2,149,939 | Kinzie et al. | Mar. 7, 1939 |

OTHER REFERENCES

"Titanium" by Wm. M. Thornton, 1927 ed., page 48. The Chemical Catalog, Inc., N. Y.